O. A. BENTON.
Hay Tedder.

No. 109,863.

Patented Dec. 6, 1870.

Witnesses:
Fred Haynes
Ferd Tusch

O. A. Benton,
per Brown Coombs & Co.
Attorneys.

United States Patent Office.

ORVILLE A. BENTON, OF AMENIA, NEW YORK.

Letters Patent No. 109,863, dated December 6, 1870.

IMPROVEMENT IN HAY-TEDDERS.

The Schedule referred to in these Letters Patent and making part of the same.

*To all whom it may concern:*

Be it known that I, ORVILLE A. BENTON, of Amenia, in the county of Dutchess and State of New York, have invented a new and useful Improvement in Hay-Tedders, of which the following is a full, clear, and exact description, reference being had to the accompanying drawing forming part of this specification, and in which—

Figure 1:
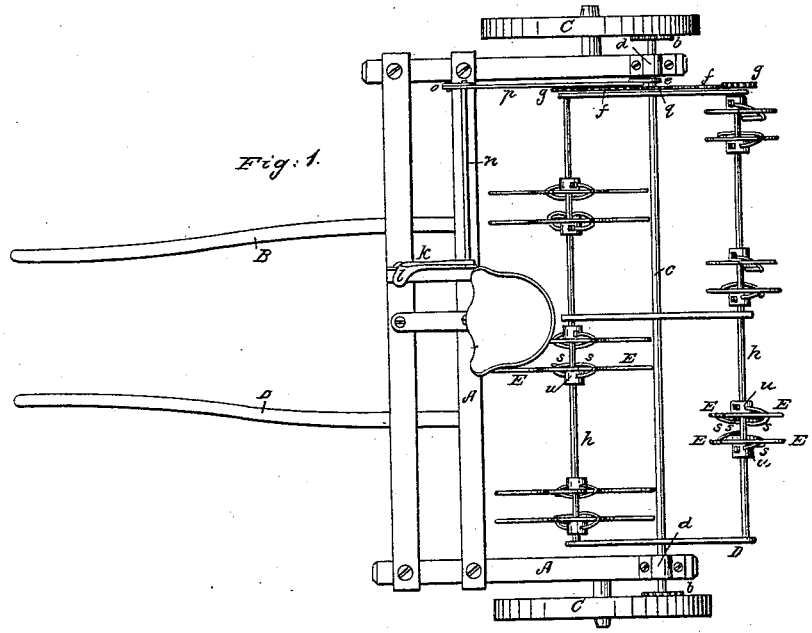
Figure 2:
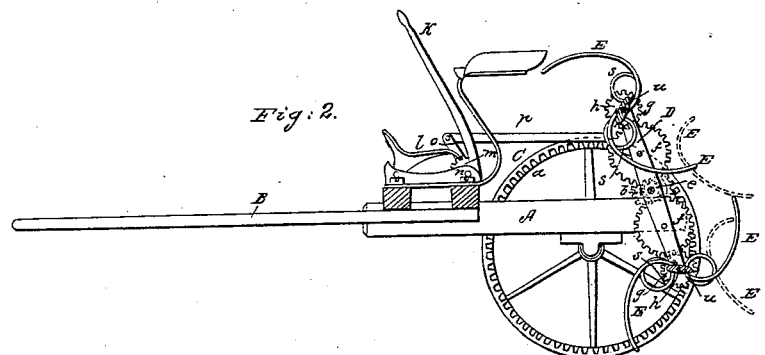
Figure 3:
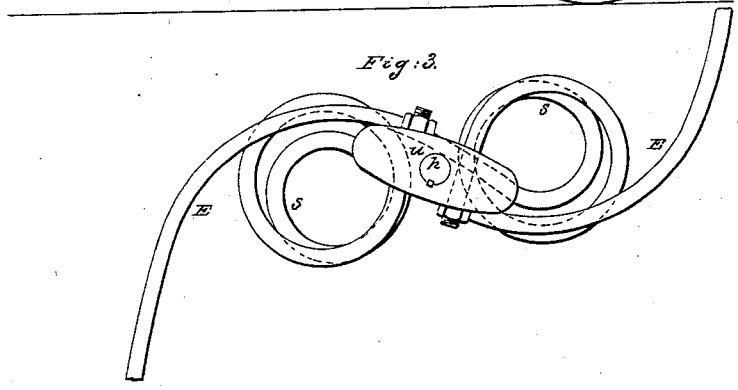

Figure 1 represents a plan of a hay-tedder constructed in accordance with my invention;

Figure 2, a longitudinal vertical section, taken through the center of the machine; and Figure 3, a side view, on a larger scale, of a pair of the tines or teeth united to the block which carries them.

Similar letters of reference indicate corresponding parts.

This invention relates to that description of hay-tedders in which the teeth are mounted on a revolving reel, and have, in addition, an independent motion of their own, to facilitate the picking up and scattering of the grass, as required; and My invention consists in a device or combination of parts for changing the position of the teeth, or raising or lowering their points, at the will of the operator, while the machine is running, to enable them to pass over obstacles, and to adjust them to different conditions of the ground or work to be done.

I will now proceed to describe it with reference to the accompanying drawing.

A is the frame of the machine, and

B B, its shafts.

C C are the running and driving-wheels, provided with internal gear, $a$, which meshes into a pinion, $b$, on either or opposite ends of the reel-shaft $c$, for the purpose of rotating the reel D.

Said driving-pinion or pinions $b$ should be connected by pawl and ratchet with the reel-shaft, to restrict the rotation of the reel to the forward travel of the machine, and, if desirable, provision likewise be made for arresting the movement of the reel in either direction of travel when required.

The reel is here shown as supported in end bearings $d\,d$, but it may, if preferred, be divided and fitted with center bearings.

On the reel-shaft $c$ is fitted a loose pinion, $e$, which has a fixed character secured to it during the rotation of the reel, except when it is required to adjust or raise and lower the tines E E, as hereinafter more fully explained.

Gearing with this pinion $e$, and revolving around it as a center in or during the rotation of the reel, are spur-wheels $ff$, which have their bearings in the arms of the reel at one end; and these wheels $ff$ are, in turn, made to gear with pinions $g\,g$, fast on revolving shafts $h\,h$, that have secured to them the tines or teeth E E.

Said wheels and pinions are so proportioned that the shafts $h\,h$, with their teeth E E, perform half a revolution for or during each whole revolution of the reel.

This secures a most efficient action for the teeth as regards their picking up and throwing off the grass, free from all liability to carry it up or around with the reel, as may be understood by reference to the different positions of the tines, represented by dotted lines in fig. 2, and, by the continuous action of the teeth on their own axes, secures a uniform and easy strain on the power as applied to the draft.

Such half revolution of the teeth on their own axes, for each whole revolution of the reel, may be effected by various mechanical devices other than the gear here described for the purpose.

To change the position of the teeth at the will of the driver, or to raise or lower their points when passing over the ground, for the purpose of clearing obstacles and adjusting them to their work, said teeth E E, with their shafts $h\,h$, may be turned as far as desirable, irrespectively of the motion they derive from the reel.

This may be done by means of a hand-lever, $k$, when released from hold by a pawl, $l$, biting into any one of a series of teeth of a curved rack portion, $m$, connected with said lever, which latter, as moved backward or forward to adjust the position of the tines, operates a shaft, $n$, that carries a crank, $o$, which is connected, by a rod, $p$, with a crank, $q$, fast to the loose pinion $e$ on the reel-shaft $c$, the turning of which pinion by the lever $k$ actuates the wheels $ff$ and pinions $g\,g$, to set or alter the position of the tines E E, as required.

Each shaft $h$ carries any number of teeth E E, made up of a succession of pairs, disposed to project from opposite sides of said shaft, whereby the teeth are caused to act alternately on the grass.

Each tooth E is coiled to form a spring, $s$, which is arranged on the opposite side of the shaft $h$ to that from which the tooth projects.

By this arrangement of the springs $s$, whether formed as described or otherwise, relatively to the shafts $h$ and points of the teeth E E, said springs, in passing over the ground, move in advance, relatively to the motion of the reel, of the forward portions of the teeth, which they respectively control, which facilitates the springing of the teeth over obstacles in their path.

Said teeth may be carried by blocks $u$, secured in any suitable manner to the shafts $h$.

I am aware that hay-tedders have been heretofore constructed with the teeth mounted on a revolving reel, and do not, therefore, claim such device broadly; but What is here claimed, and desired to be secured by Letters Patent, is—

The gear-wheels $e\ f\ g$, for rotating the tines E on their axes, irrespective of their rotation with and around the axis of the reel, in combination with crank $q$, whereby their points may be raised or lowered in passing over the ground, essentially as specified.

O. A. BENTON.

Witnesses:
  FRED. HAYNES,
  W. MORRIS SMITH.